United States Patent [19]

Bell

[11] Patent Number: 5,520,428
[45] Date of Patent: May 28, 1996

[54] MOVABLE BUMPER FOR VEHICLES

[76] Inventor: Foyster G. Bell, 5111 S. Palm, Las Vegas, Nev. 89120

[21] Appl. No.: 330,624

[22] Filed: Oct. 27, 1994

[51] Int. Cl.⁶ .................................................. B60R 19/38
[52] U.S. Cl. ........................................... 293/118; 293/102
[58] Field of Search .................................. 293/9, 10, 102, 293/103, 118, 119; 296/180.1, 180.5; 280/763.1, 764.1, 765.1

[56] References Cited

U.S. PATENT DOCUMENTS

| | | | |
|---|---|---|---|
| 4,018,299 | 4/1977 | Nagin, Jr. et al. | 293/118 |
| 4,247,138 | 1/1981 | Child | 293/103 |
| 4,514,002 | 4/1985 | McIntosh | 293/118 |
| 4,582,351 | 4/1986 | Edwards | 293/118 |
| 4,988,258 | 1/1991 | Lutz et al. | 293/118 |
| 5,022,703 | 6/1991 | Westbrook | 293/118 |

FOREIGN PATENT DOCUMENTS

| | | | |
|---|---|---|---|
| 2352-179 | 4/1975 | Germany | 293/118 |
| 2843-670 | 4/1980 | Germany | 293/118 |
| 2-133262 | 5/1990 | Japan | 293/118 |
| 6-270750 | 9/1994 | Japan | 293/118 |

*Primary Examiner*—Dean Kramer
*Attorney, Agent, or Firm*—Townsend and Townsend and Crew

[57] ABSTRACT

A bumper assembly for mounting on a vehicle and movable between at least a first lower position suitable for highway driving and a second elevated position for off road operations is provided and includes a bumper rotatably mounted to the frame of a vehicle.

A piston located on the vehicle moves the bumper between the first lower position suitable for highway driving and the second elevated position for off road operations. An actuator activates the piston for moving the bumper and controls are provided for activating the actuator.

5 Claims, 2 Drawing Sheets

MOVABLE BUMPER FOR VEHICLES

BACKGROUND OF THE INVENTION

The present invention is directed to a truck bumper that is movable between at least a first lower position suitable for highway driving and a second elevated position suitable for off road operations.

Many types of vehicles, such as cement trucks, for example, are used in both highway and off road working operations. In order to be certified for highway driving in many states, the bumpers on such trucks must be no higher than a limited distance above the road surface. The state of Nevada, for example, requires that bumpers be no more than 20 inches above and no more than 30 inches above the road bed when the truck is being operated on the highway. Other states have similar requirements. However, when such trucks are off road in working operations a bumper in such a low position may interfere with many operations that the trucks are required to perform. This is particularly true with the rear bumper on a cement truck which, when locked in place in a lower position suitable for the highways, makes it impossible to easily access jobs when there is a need to deliver cement over a curb or a footer for a building. The present invention is directed to a movable bumper which will satisfy both highway regulations and also provide ample clearance for working off road operations.

BRIEF DESCRIPTION OF THE PRESENT INVENTION

The present invention provides a bumper for mounting on a vehicle that is movable between at least a first lower position suitable for highway driving and a second elevated position that is suitable for working conditions. The bumper is preferable rotatably mounted to the frame of the vehicle and means are provided for moving the bumper between the first position and the second position. Piston means which normally may be adapted to lock the bumper in the first lower position for highway driving are connected to both the frame of the vehicle and the rotatably mounted bumper. The piston means are preferably pneumatic and are activated by the vehicles air supply system which is operably connected to the piston means. Activating means, such as solenoid valves are connected into the air supply system to cause the piston means to either retain the bumper in the lower highway position or to move the bumper to the elevated working position. Normally the bumper is locked in a first position i.e., the lower highway position. A control means is operably connected to the activating means to cause the piston means to move the bumper between the positions. In the preferred embodiment the control means is activated when the shift transmission selector is moved to a selected position, such as low low range, to cause the activating means to operate the piston means to move the bumper to the elevated working position. Moving the shift transmission selector out of the selected gear causes the control means to operate the activating means to return the bumper to the lower highway position.

OBJECT OF THE INVENTION

A principal object of the present invention is to provide a vehicle bumper which both conforms to the requirements for highway driving and which also may be moved to an alternative position to facilitate working operations. Further objects and advantages of the present invention will becomes apparent to one skilled in the art from the following detailed description read in view of the accompanying drawings which are made a part of this specification.

DETAILED DESCRIPTION OF THE INVENTION

Figure 1:
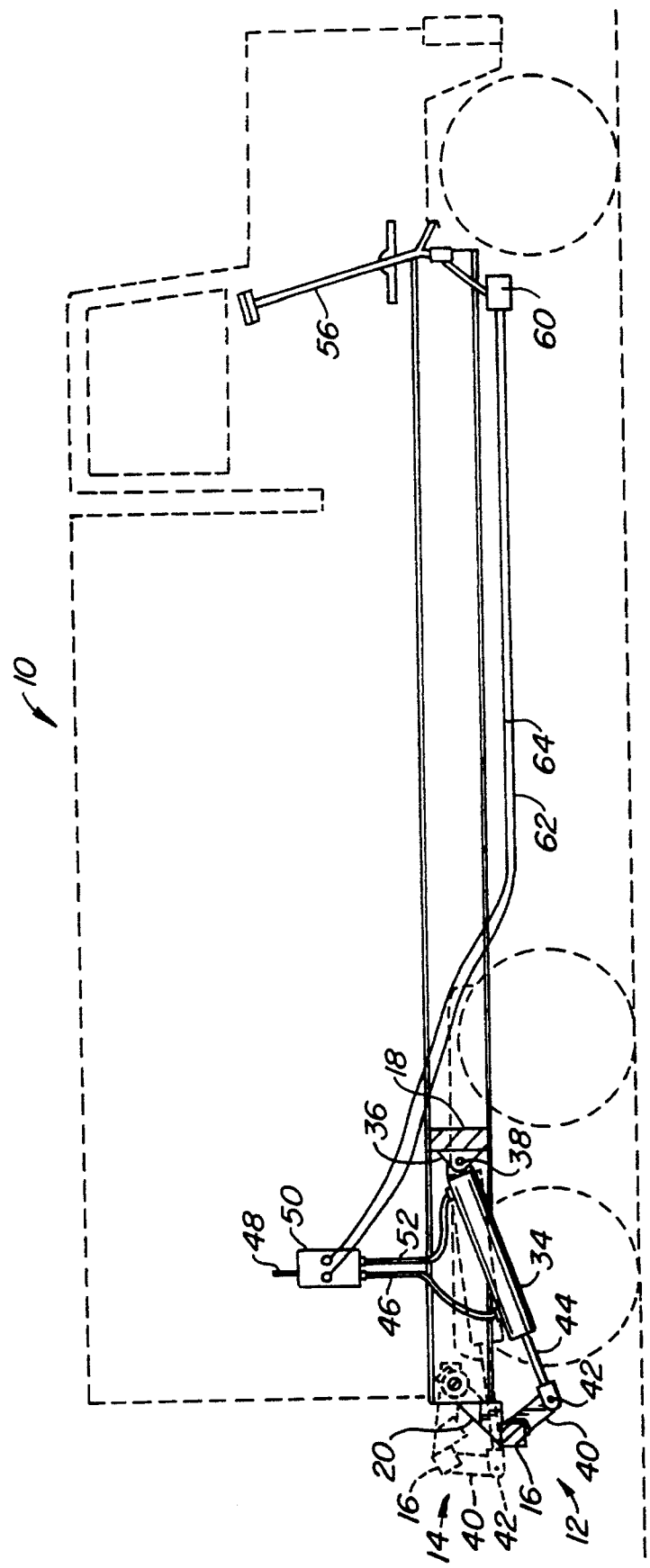
FIG. 1 is a schematic elevation view and illustrates the preferred arrangement of apparatus assembled in accordance with the present invention.

The present invention provides an adjustable bumper assembly for a vehicle such as a cement truck which is schematically illustrated in FIG. 1 by the numeral 10. The bumper assembly is movable between at least two positions. It is normally maintained in a position suitable for highway driving in accordance with I.C.C. rules as generally indicated by the numeral 12. In accordance with the invention the bumper assembly is movable to a second elevated position for off road working operations as shown in phantom in FIG. 1 and generally indicated by the numeral 14.

Figure 2:
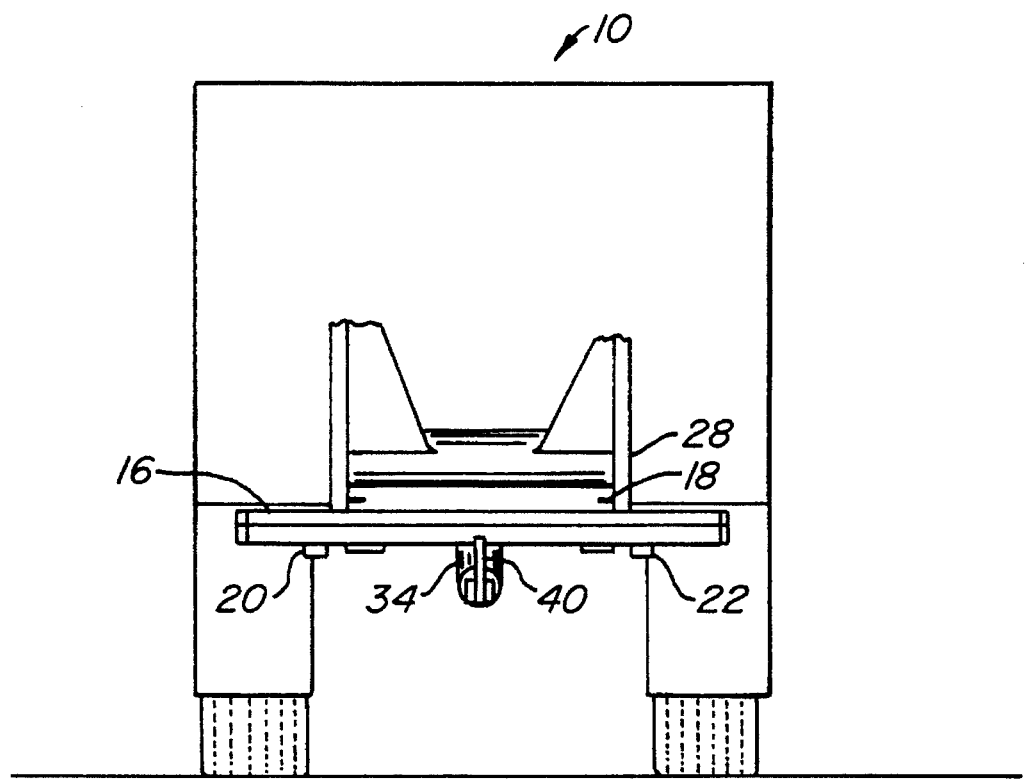
FIG. 2 is a rear elevation view of the preferred embodiment of the invention.
Figure 3:
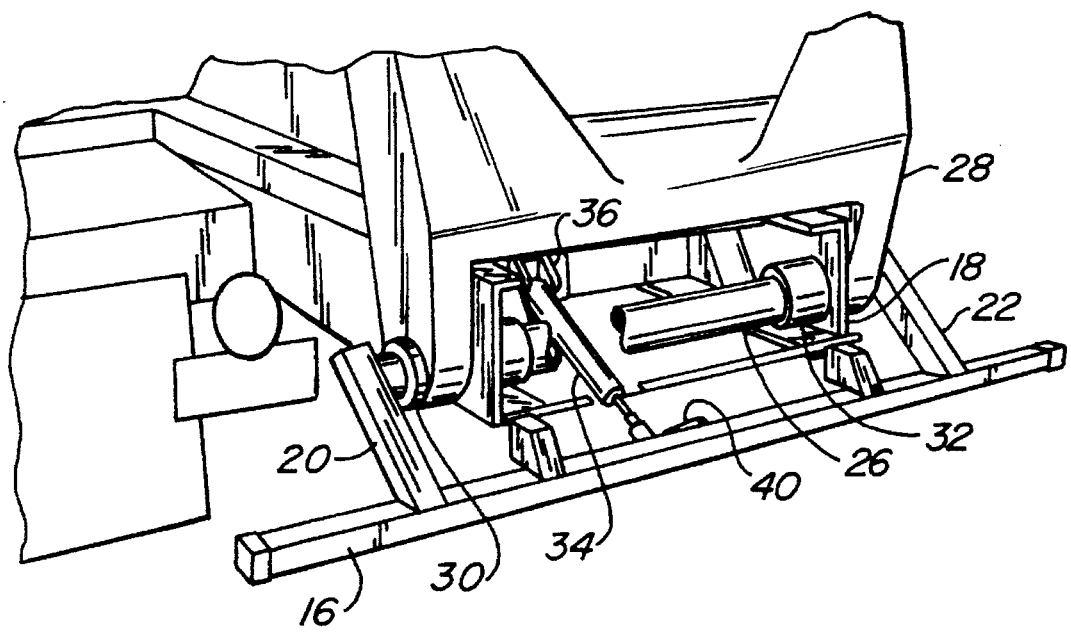
FIG. 3 is a perspective view of the preferred embodiment of the invention.

The bumper assembly of the present invention is shown in more detail in FIGS. 2 and 3. As shown in FIG. 3 a bumper 16 is normally maintained in a first lower position suitable for highway driving. The bumper 16 may be elevated to facilitate off road operations as shown in FIG. 2. The bumper 16 is connected to the frame 18 of the vehicle 10. In preferred form the bumper 18 is rotatably connected to the vehicle frame 18 by means of arm members 20 and 22 which are fixedly connected to an axial member 26. The axial member 26 rotatably extends through the frame 18 and the rearward portion 28 of the truck body. The axial member is maintained in such position by means of collars 30, 32. Thus the bumper is rotatably maintained on the frame of the vehicle.

Means are provide to move the bumper 16 from the lower position suitable for highway driving as shown in FIG. 3 and a position suitable for off highway operations as shown in FIG. 2. Thus a piston means 34 is rotatably connected to the vehicle frame 18 by means of flange 36 and pin 38. The piston means 34 is also rotatably connected to the bumper 16 by means of flange 40 and pin 42. Thus as is shown in FIG. 1 when the piston means is in normal position the bumper 16 is maintained at a first lower position for highway operations and when the piston means is activated and rod 44 extended the bumper 16 is moved to a second elevated position suitable for off highway operations.

As noted the bumper 16 is normally maintained in the first lower position. This is accomplished by the piston means 34 normally being retained in a retracted position. Thus when the piston means is fluid driven, for example from the vehicle's compressed air supply, the piston is maintained in the first position by means of fluid entering the piston from line 46 from an air supply line 48 which connects through an actuating valve 50. Actuating valve 50 is preferably a solenoid valve. When the operator desires to perform operations wherein the bumper needs to be elevated the actuating valve 50 is actuated and the piston 34 is caused to extend rod 44 by means of air supplied via line 48 through the actuating valve 50 and supply line 52 to lock the bumper 16 at the position shown in phantom in FIG. 1. While a pneumatic system is preferred, a hydraulic system is also useful in the present invention.

In preferred form the control means which activates the activating valve 50 to move the bumper from its normal first position to an elevated second position is interconnected with the transmission gear selector 56. Thus when the transmission gear selector 56 is shifted into a predetermined gear the control means such as switch 60 operates to actuate the actuating valve 50 to move the bumper 16 to an elevated position. Typically the predetermined gear selection is one that would be used only for off highway working operations. In cement trucks this is normally the low-low range. When the transmission gear selector is moved out of the selected range the switch 60 connected thereto is again triggered and the actuating valve 50 is activated by means of leads 62, 64 to return the bumper to the lower highway position. In this manner a fail safe assembly is provided which automatically positions the bumper in the appropriate positions.

The present invention provides a movable bumper assembly which may be retrofitted onto an existing truck using the fluid supply system of the truck. In addition, if a truck does not have a pneumatic or hydraulic system readily available, the components may be added to the system to facilitate assembly on the truck.

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. Accordingly, all such variations and changes which fall within the spirit and scope of the present invention is defined in the following claims are expressly intended to be embraced thereby.

What is claimed is:

1. A bumper assembly for mounting on a vehicle and movable between at least a first lower position suitable for highway driving and a second elevated position for off road operations comprising a bumper; means for rotatably mounting said bumper to the frame of a vehicle; piston means connectable to said frame of the vehicle and to said bumper for moving said bumper between said first lower position suitable for highway driving and said second elevated position for off road operations; said piston means normally retaining said bumper fixed in said first lower position; actuating means for activating said piston means for moving said bumper between said first lower position and second elevated position and control means activated by the transmission gear selector for activating said actuating means; wherein said control means activates said actuating means to move said bumper to said second elevated position from said first lower position when said transmission gear selector is shifted into a predetermined low gear and activates said actuating means to return said bumper from said second elevated position to said first lower position when said transmission gear shaft selector is shifted out of said predetermined low gear and said actuating means for moving said bumper includes the pneumatic system of the vehicle.

2. A bumper assembly mounted on the frame of a vehicle and moveable between at least a first lower position suitable for highway driving and a second elevated position for off road operations comprising a bumper; an axial member rotatably connected to said frame for rotatably mounting said bumper to the frame; at least a pair of spaced apart arm members fixedly connecting said bumper to said axial member; a flange connected to said bumper intermediate the ends thereof and depending downwardly therefrom; piston means located adjacent the middle of said bumper and connected to said frame of the vehicle and to the flange of said bumper for moving said bumper between said first lower position suitable for highway driving and said second elevated position for off road operations; said piston means normally retaining said bumper fixed in said first lower position; a transmission gear selector; actuating means for activating said piston means for moving said bumper between said first lower position and second elevated position and control means activated by the transmission gear selector for activating said actuating means.

3. The bumper assembly of claim 2 further characterized in that said control means activates said actuating means to move said bumper to said second elevated position from said first lower position when said transmission gear selector is shifted into a predetermined gear and activates said actuating means to return said bumper from said second elevated position to said first lower position when said transmission gear shaft selector is shifted out of said predetermined gear.

4. The bumper assembly of claim 3 further characterized in that the actuating means for moving said bumper includes the pneumatic system of the vehicle.

5. A bumper assembly mounted on a cement truck type vehicle and movable between at least a first lower position suitable for highway driving and a second elevated position for off road operations comprising a cement type truck having a frame; a bumper; an axial member rotably connected to said frame for rotatably mounting said bumper to the frame; at least a pair of spaced apart arm members fixedly connecting said bumper to said axial member; a dependingly extending flange connected to said bumper intermediate said arm members; piston means connected to said frame of the vehicle intermediate said arm members and to said flange of said bumper for moving said bumper between said first lower position suitable for highway driving and said second elevated position for off road operations; said piston means normally retaining said bumper fixed in said first lower position; actuating means for activating said piston means for moving said bumper between said first lower position and second elevated position and control means activated by the transmission gear selector for activating said actuating means; wherein said control means activates said actuating means to move said bumper to said second elevated position from said first lower position when said transmission gear selector is shifted into a predetermined low gear and activates said actuating means to return said bumper from said second elevated position to said first lower position when said transmission gear shaft selector is shifted out of said predetermined low gear and said actuating means for moving said bumper includes the pneumatic system of the vehicle.

\* \* \* \* \*